(12) United States Patent
Abel et al.

(10) Patent No.: US 7,372,876 B2
(45) Date of Patent: May 13, 2008

(54) METHOD FOR SETTING UP A USEFUL DATA LINK BETWEEN TERMINALS IN A VOIP SYSTEM

(75) Inventors: Urich Abel, Essen (DE); Bruno Bozionek, Borchen (DE); Roland Roth, Gelsenkirchen (DE); Rainer Zimmermann, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 865 days.

(21) Appl. No.: 10/655,609

(22) Filed: Sep. 5, 2003

(65) Prior Publication Data

US 2004/0170180 A1 Sep. 2, 2004

(30) Foreign Application Priority Data

Sep. 5, 2002 (DE) .............................. 102 41 179

(51) Int. Cl.
*H04J 3/12* (2006.01)
(52) U.S. Cl. .................. 370/524; 370/522; 370/466; 370/467
(58) Field of Classification Search ............ 370/395.2, 370/464–467, 229, 230, 235, 351, 352, 354, 370/357, 360, 384, 385, 386, 389, 392, 400, 370/401, 422, 426, 438, 439, 469, 474, 522, 370/524
See application file for complete search history.

(56) References Cited

U.S. PATENT DOCUMENTS 6,621,814 B1 * 9/2003 Korpi et al. ................ 370/352
6,636,528 B1 * 10/2003 Korpi et al. ................ 370/467
6,930,999 B1 * 8/2005 Craig et al. ................ 370/352
7,082,119 B1 * 7/2006 Tamsil ....................... 370/352
7,110,391 B1 * 9/2006 Rogers et al. .............. 370/352
7,162,530 B2 * 1/2007 Selitrennikoff et al. ..... 709/230

FOREIGN PATENT DOCUMENTS

DE          10040444        3/2002
EP          1091551         4/2001
WO          0111838         2/2001

* cited by examiner

*Primary Examiner*—Wing Chan
*Assistant Examiner*—Mark A. Mais
(74) *Attorney, Agent, or Firm*—Staas & Halsey LLP

(57) ABSTRACT

At least one switching instance is provided in a VoIP system in order to set up a useful data link between a calling terminal and a called terminal. A first signaling link is set up between each terminal and the at least one switching instance for interchanging information on the basis of a first protocol, a second signaling link is set up between them for interchanging information on the basis of a standardization second protocol, in which the useful data link is set up on the basis of the information interchanged on the basis of the second protocol. At least the second signaling link is initiated by the calling terminal, with the information which is transmitted via the first signaling link and in parallel via the second signaling link from the terminals being in each case combined.

12 Claims, 1 Drawing Sheet

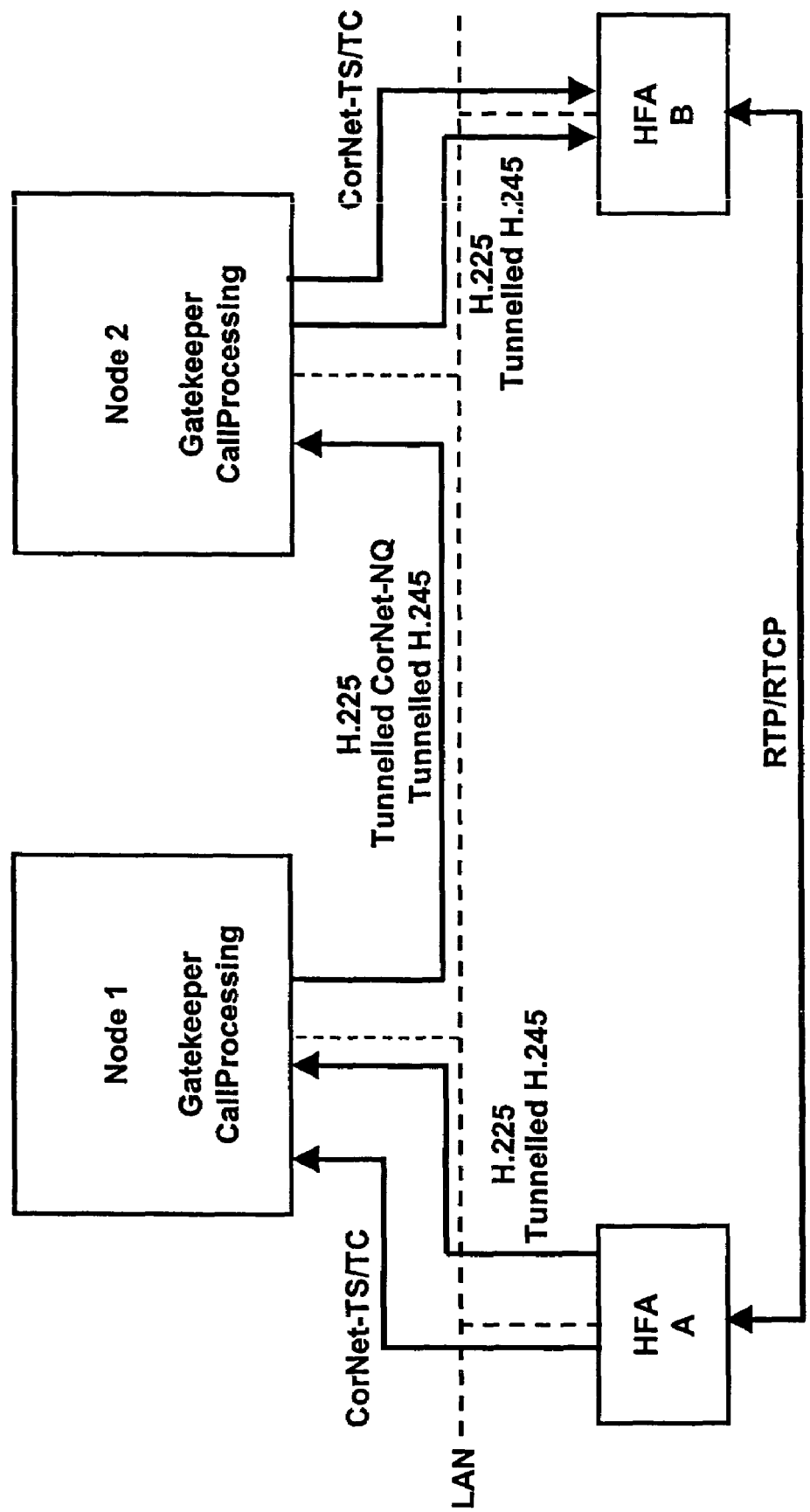

METHOD FOR SETTING UP A USEFUL DATA LINK BETWEEN TERMINALS IN A VOIP SYSTEM

CROSS REFERENCE TO RELATED APPLICATIONS

This application is based on and hereby claims priority to German Application No. 10241179.4 filed on Sep. 5, 2002, the contents of which are hereby incorporated by reference.

BACKGROUND OF THE INVENTION

The invention relates to a method for setting up a useful data link between terminals in a VoIP system.

Communication networks whose components communicate with one another on a packet-switched basis are being increasingly used instead of line-switching communication networks. Networks such as these are also referred to in the literature as Voice-over-IP system (VoIP for short) networks, if the Internet Protocol (IP) is used for interchanging acoustic information in the form of data.

While telephones are generally used as terminals for line-switching telephony, the expression terminals is generally used in VoIP communication networks, because other devices, for example multimedia PCs, can also be used in addition to voice terminals, that is to say telephones.

The terminals in VoIP communication networks interchange data with one another during active operation. In this case, a distinction is drawn between control data and useful data. While the useful data in the case of voice terminals comprises the digitized speech signal, a control data is used to initiate and to control links between terminals. The service features which are also already known from line-switching-telephony, such as dialing, call back, call brokering, display indications and connection clearing, are provided by the control data in VoIP communication networks.

In "classical" line switching telephony, the terminals are not directly connected to one another, but are connected to a central switching instance, that is to say to a communication system. The control data sent by the terminals is evaluated by the communication system, and the useful data, that is to say the digitized speech information, is passed from the communication system to the respective terminal.

In the case of VoIP communication networks, on the other hand, the useful data is interchanged on direct paths between the terminals, while the control data is in most cases evaluated and passed on via a central instance. In networks such as these, this central instance is, for example, what is referred to as a gatekeeper, which, inter alia, carries out the conversion between call numbers and network addresses, and, thus, controls the setting up of links between the two terminals.

When interchanging control data and useful data, all the terminals, terminals and other network components in the communication networks have to comply with conventions (norms), which are defined in protocols and protocol families. By way of example, the Euro-ISDN Protocol E-DSS1 and the company-specific protocol CorNet-TS protocol are used in the line-switching communication network such as the ISDN, while the ITU-T H.323 protocol is widely used in VoIP communication networks. In this case, the only functions and service features which can ever be implemented in the communication networks are those which are defined in the protocol or protocol family that is being used. In this case, compliance with the conventions agreed in the protocols is important in order to make it possible to use components from different manufacturers and also to connect networks of different operators or different national states to one another.

While that part of the H.323 protocol family which defines the convention for transmission of the useful data in most cases corresponds to the requirements of the terminals that are used nowadays, the H.323 protocol elements for connection control (signaling) often do not (any longer) comply with the requirements. For example, these protocol elements do not allow the implementation of all the functions and service features which are known from the line-switching telephony protocols mentioned above. For this reason, not only is a control data channel set up on the basis of the H.323 protocol between the terminals and the gatekeeper (or the gatekeepers) in VoIP communication networks, but, in addition to this, a further controlled data channel is setup in parallel, which generally operates in accordance with a company-specific protocol and is required to provide functions and service features which are not defined in the H.323 protocol. This relates in particular to functions and convenience functions which are required for setting up links to modern terminals and which are not supported in the H.323 standard, such as short code dialing, extensive display indications and special calling and ringing tones. Thus, when setting up a connection which is initiated from one terminal, a control data link is first of all set up in accordance with a company-specific protocol between the calling terminal and the associated VoIP communication system with the gatekeeper functionality, and this VoIP communication system then sets up a control data channel to the calling terminal in accordance with the H.323 protocol.

The known method for setting up the link in VoIP communication networks has been found to have the disadvantage that the setting up of the H.323 link from the VoIP communication system to the terminal makes it impossible to use terminals which comply with H.323 standard to set up the connection in the opposite direction.

SUMMARY OF THE INVENTION

One possible object of the invention is to ensure that terminals in VoIP communication networks operate in compliance with the standard, without any restriction to functions and service features.

The achievement of this object provides that at least the second signaling link is initiated by the calling terminal, and the information which is transmitted via the first signaling link and in parallel via the second signaling link from the terminals is in each case combined. The use of a standardized protocol for the second signaling link makes it possible to use standard (for example H.323) terminals. The services features "Fast Connect Procedure", "H245 Tunneling" and "Parallel H245 Tunneling" in the H.323 standard are thus supported and synchronization of the information which is transmitted via the two signaling links allows Callprocessing to process this information as if it had been transmitted via a single link.

When the useful data link is established, and once the signaling link between the terminals has been set up and even before the called terminal receives the call, the waiting time after call acceptance is reduced.

CallProcessing can access all of the control data in an analogous manner to line-switching communication networks by the combined information being handled by the at least one switching instance as if it had been transmitted via a single signaling link.

In situations in which two or more switching instances are arranged between the end terminals, and if the combined information is transmitted within one signaling link between the switching instances, these switching instances can communicate with one another on a line-switching basis and need not support the protocol of the VoIP system.

If the second protocol is the ITU-H.323 or the IETF-SIP protocol, any terminals and components which can comply with these protocols, even from other manufacturers, can be used in the VoIP system.

If the first protocol is a proprietary protocol, all the functions and service features which are provided by the respective manufacturer of the switching instance and the terminals can be used in the VoIP system.

The first protocol is expediently used to transmit that information which is not defined in the second protocol, so that functions and service features which are not provided in the second protocol can be used in the VoIP system.

BRIEF DESCRIPTION OF THE DRAWINGS system will be described in the following text with reference to the drawings.] These and other objects and advantages of the present invention will become more apparent and more readily appreciated from the following description of the preferred embodiments, taken in conjunction with the accompanying drawing which is a packet-switching network LAN, in which two communication nodes Node 1, Node 2 are arranged.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The single FIGURE shows a packet-switching network LAN, in which two communication nodes Node 1, Node 2 are arranged. The communication nodes Node 1, Node 2 are systems for speech data transmission in data networks, referred to as VoIP systems (VoIP=Voice over IP; IP=Internet Protocol). In this case, each of the communication nodes Node 1, Node 2 is formed from a gatekeeper and a control unit, the so-called CallProcessing. The terminals HFA A, HFA B are also arranged as communication subscribers in the network LAN, with the terminal HFA A being a telephone terminal with a LAN interface that is registered with the communication node Node 1, and the terminal HFA B being a telephone terminal with a LAN interface which is registered with the communication node Node 2. The arrows shown in the FIGURE represent logical connecting channels. In this case, the arrow direction indicates that transmission direction in which the respective transmission channel is used for the first time in the following example.

The terminals HFA A, HFA B are VoIP terminals ("IP telephones") which in principle transmit the useful data, that is to say the speech data, in accordance with the ITU-T H.323 protocol and the dependent standards that are defined in this standard. However, there are a large number of service features which, although known from line-switching telephony, are not, however, defined in the H.323 protocol family. Service features such as these are likewise mapped with the aid of standardized protocols in line-switching telephony for private communication networks in the D-channel of an ISDN link, for example by the Euro ISDN protocol EDSS-1 or by company-specific protocols such as CorNet-TS. In VoIP communication networks, these service features are each transmitted in a separate data link between the terminals HFA A, HFA B and the communication nodes Node 1, Node 2 associated with them. For this purpose, the messages in the CorNet-TS protocol as known form ISDN communication systems are packed into data packets which are transported in accordance with the Internet Protocol that is used in the network LAN. In this case, the transmission standard for the CorNet-TS data transported in this way is referred to as CorNet-TS/TC. Any other protocol which supports the required service features may, of course, also be used for transmission of the messages between the terminals HFA A, HFA B and the communication nodes Node 1, Node 2. In the same way, a different protocol may be used instead of the standardized transmission protocol H.323 that has been referred to, provided that this protocol supports the transmission of speech data in a data network, for example the IETF-SIP (IETF=Internet Engineering Task-Force; SIP=Session Initiation Protocol).

The setting up of a speech link between the terminals HFA A and HFA B will be described in the following text. In this case, the connection is set up from the terminal HFA A via the communication node Node 1 to the communication node Node 2, and from there to the terminal HFA B. The useful data, that is to say the data packets with the speech data, is transmitted directly, once this link has been set up, between the terminals HFA A and HFA B via the packet-switching network LAN.

After the initialization on connection of a terminal HFA A, HFA B, to the network, a CorNet-TS/TC link is set up between each terminal HFA A, HFA B and the respectively associated communication node Node 1, Node 2. This is then established in order, for example, in each case to update display messages (data, time), or to control signal lights (for example direct call keys or mailbox functions).

The user of the terminal HFA A which is in the form of a telephony terminal (IP-Telephone) lifts the handset of the telephone in order to start a call. The message that the handset has been lifted is transmitted from the terminal HFA A via the CorNet-TS/TC link to the communication node Node 1. The communication node Node 1 sends the command to switch on the dialing tone to the handset (or to the loudspeaker) to the terminal HFA A via the return channel in the CorNet-TS/TC link. The user now dials the call number of the terminal HFA B, with each individual key that is pressed being transmitted as a message via the CorNet-TS/TC link to the communication node Node 1.

Whilst the dialing process is being completed, the communication Node 1 sends to the terminal HFA A the command to set up the link in accordance with H.323 protocol to the communication node Node 1. To do this, the terminal HFA A first of all sets up a control channel in accordance with the H.323 substandard H.225 in which signaling data is transmitted. In this case, data fields are also filled with data in the data channel in accordance with H.225, although this does not comply with the standard. Data such as this is transmitted together with the data in accordance with the protocol to the terminal of the H.225 link. In the present example, protocol elements to the H.323 substandard H.245 are transmitted in data fields such as these and, for example, these protocol elements contain the audio codec that is used by the terminal HFA A. This transmission of elements that are not covered by the protocol in specific data fields such as these, that is to say data containers, is referred to as "tunneling".

The interfaces of the communication nodes Node 1, Node 2 at which the data on the CorNet-TS/TC and H.225 links is interchanged with the respectively associated terminals HFA A, HFA B are designed such that the information transmitted separately to the communication nodes Node 1, Node 2 on the CorNet-TS/TC and H.225 links is combined and is passed on in a synchronized manner to the CallProcessing. Conversely, this interface separates the information at the communication nodes Node 1, Node 2 such that the information which is associated with the CorNet-TS protocol is transmitted via the CorNet-TS/TC link to the terminals HFA A, HFA B, while that part of the information which is defined in the H.225 protocol is transmitted via the H.225 link. This also includes the information in accordance with the H.245 protocol, which is transmitted "tunneled" using the H.225 protocol. The synchronization of the two data streams also makes it possible to evaluate the signaling information, which originates from the H.323 protocol, in accordance with the H.225 protocol by the CallProcessing in the communication nodes Node 1, Node 2.

The described H.225 data channel is passed on from the communication node Node 1 to the communication node Node 2, and from there to the terminal HFA B. Not only is the information in accordance with the H.245 protocol tunneled on the basis of the method described, in this link in accordance with the H.225 protocol, but networking information going beyond this is also tunneled in this way, as is also known from the networking of line-switching communication nodes. A standardized networking protocol that is known from line-switching telephony is the ECMA/ISO-QSIG protocol; the proprietary protocol CorNet-NQ is used in this case. The "tunneling" of the networking information that is mapped in the CorNet-NQ protocol allows the data to be interchanged between the communication nodes Node 1, Node 2 to be transmitted using any network which complies with the H.323 protocol.

The information which is transmitted in the course of the H.225 protocol link is evaluated by the communication node Node 2 where all the relevant information which has been transmitted so far via the H.225 and CorNet-TS/TC links is thus now available via the speech link initiated from the terminal HFA A. This includes in particular the call number and, possibly, also the name of the terminal HFA A, the call number of the called terminal HFA B, the description of the audio coding used by the terminal HFA A and the description of the data channel RTP/RTCP on which the terminal HFA A which is to receive the useful data, that is to say the speech data, for the desired link from the terminal HFA B.

The communication network Node 2 now sets the link in accordance with the H.225 protocol to the terminal HFA B, in order to transmit the information via the desired link that has been set up in accordance with the H.225 protocol and the tunneled information in accordance with H.245. This information is defined in the H.323 protocol family. At the same time, the communication node Node 2 uses the Cor-Net-TS/TC link to the terminal HFA B in order to transmit the additional information, which is not defined in the H.323 protocol, to the terminal HFA B. This includes, for example, information about the display message with the name of the calling terminal HFA A.

The terminal HFA B now uses the information about the desire for a link transmitted using the H.225 channel to transmit a confirmation message via the H.225 link, likewise including the tunneled information in accordance with the H.245 protocol as well as the data about that useful channel RTP/RTCP on which the terminal HFA B can receive the speech data from the terminal HFA A. This message is passed from the terminal HFA B via the communication node Node 2 and the communication node Node 1 to the terminal HFA A. The communication node Node 2 now transmits via the CorNet-TS/TC link to the terminal HFA B the command to signal the incoming call by the device alarm, while the communication node Node 1 transmits via the CorNet-TS/TC link to the terminal HFA A the command to connect the dialing tone to the handset (or to the loudspeaker) of the terminal HFA A.

When the messages transmitted from the terminal HFA A, in the data channel based on the H.225 protocol, are received at the terminal HFA B, and when the corresponding return messages are received at the terminal HFA A, the two useful data channels RTP/RTCP which are required for the transmission of the speech data are established. However, no useful data packets have yet to be transmitted at this time, because the subscriber at the terminal HFA B has not yet accepted the call. The method for establishing the useful data channels before the acceptance of the call by the called subscriber is provided as "FastConnect" in the H.323 protocol.

As soon as the subscriber at the terminal HFA B lifts the handset, this results in this event being transmitted from the terminal HFA B via the CorNet-TS/TC link to the communication node Node 2. Once again using the CorNet-TS/TC link, the communication node Node 2 now transmits the command to the terminal HFA B to complete the process of setting up the link. On receiving this command, the terminal HFA B sends the appropriate "Connect" message via the H.225 link to the communication node Node 2, from there to the communication node Node 1, and from there to the terminal HFA A. This message is also evaluated by the two communication nodes Node 1, Node 2 which transmit the command to change to the speech mode via the respective CorNet-TS/TC link to the respective terminals HFA A and HFA B which are associated with them. The two terminals HFA A, HFA B now switch on the microphones in the handsets and start to transmit the speech data via the already established RTP/RTCP links.

The invention has been described in detail with particular reference to preferred embodiments thereof and examples, but it will be understood that variations and modifications can be effected within the spirit and scope of the invention.

What is claimed is:

1. A method for setting up a useful data line between a calling terminal and a called terminal in a voice over IP system having at least one switching unit, comprising:
    setting up first signaling links respectively between the calling terminal and the switching unit and between the called terminal and the switching unit for interchanging information on the basis of a first protocol;
    initiating second switching links from the calling terminal;
    setting up second signaling links respectively between the calling terminal and the switching unit and between the called terminal and the switching unit for interchanging information on the basis of a standardized second protocol;
    setting up a useful data link on the basis of the information interchanged on the basis of the second protocol;
    transmitting information in parallel via the first signaling link and via the second signaling link; and
    combining the information transmitted in parallel wherein information relating to features which are not defined in the second protocol is transmitted using the first protocol.

2. The method as claimed in claim 1, wherein the useful data link is established once the signaling link between the terminals has been set up, before the called terminal accepts a call originating from the calling terminal.

3. The method as claimed in claim 1, wherein the information transmitted in parallel is handled by the switching unit after combining as if it had been transmitted via a single signaling link.

4. The method as claimed in claim 1, wherein
there are two switching units between the terminals, and information transmitted in parallel is transmitted within
one signaling link between the switching units after being combined.

5. The method as claimed in claim 1, wherein the second protocol is the ITU-H.323 Protocol or the IETF-SIP-Protocol.

6. The method as claimed in claim 1, wherein the first protocol is a proprietary protocol.

7. The method as claimed in claim 2, wherein the information transmitted in parallel is handled by the switching unit after combining as if it had been transmitted via a single signaling link.

8. The method as claimed in claim 7, wherein
there are two switching units between the terminals, and information transmitted in parallel is transmitted within
one signaling link between the switching units after being combined.

9. The method as claimed in claim 8, wherein the second protocol is the ITU-H.323 Protocol or the IETF-SIP-Protocol.

10. The method as claimed in claim 9, wherein the first protocol is a proprietary protocol.

11. A method for setting up a voice over IP connection in a communication system comprising a calling terminal, a called terminal, and first and second switching unit, the method comprising:

setting up first signaling links respectively between the calling terminal and the first switching unit and between the called terminal and the second switching unit, for interchanging information on the basis of a first protocol;

setting up second signaling links respectively between the calling terminal and the first switching unit and between the called terminal and the second switching unit for interchanging information on the basis of a standardized second protocol, which is different from the first protocol;

exchanging first and second portions of the signaling information separately on the first and second links, respectively, between the calling terminal and the first switching unit and between the called terminal and the second switching unit;

tunneling and extracting the first portion of the signaling information at the switching units such that between the first and second switching units, the first and second portions of the signaling information are exchanged together; and setting up a useful data link between the first and second terminals for exchanging voice over IP data on the basis of the second protocol.

12. The method as claimed in claim 1, wherein
the calling terminal is connected to a first switching unit and the called terminal is connected to a second switching unit, and the first and second switching units tunnel the information from the first signaling link for transmission between the first and second switching units, and the first and second switching units extract the information of the first signaling link for transmission between the first switching unit and the calling terminal and between the second switching unit and the called terminal.

* * * * *

UNITED STATES PATENT AND TRADEMARK OFFICE
CERTIFICATE OF CORRECTION

PATENT NO. : 7,372,876 B2  Page 1 of 1
APPLICATION NO. : 10/655609
DATED : May 13, 2008
INVENTOR(S) : Urich Abel et al.

It is certified that error appears in the above-identified patent and that said Letters Patent is hereby corrected as shown below:

On the Title Page, item [75] (Inventors), Line 3, change "Gelsenhirchen" to --Gelsenkirchen--.

Title Page, Column 2 (Abstract), Line 7, change "standardization" to --standardized--.

Column 2, Line 53, change ""H245" to --"H.245--.

Column 2, Line 54, change "H245" to --H.245--.

Column 2, Lines 56-57, change "Callprocessing" to --CallProcessing--.

Signed and Sealed this

Twenty-third Day of September, 2008

JON W. DUDAS
*Director of the United States Patent and Trademark Office*